(12) United States Patent
Kogami et al.

(10) Patent No.: US 12,224,450 B2
(45) Date of Patent: Feb. 11, 2025

(54) POWER SUPPLY DEVICE, AND ELECTRIC VEHICLE AND POWER STORAGE DEVICE THAT COMPRISE SAID POWER SUPPLY DEVICE

(71) Applicant: SANYO Electric Co., Ltd., Osaka (JP)

(72) Inventors: Nao Kogami, Hyogo (JP); Hiroyuki Takahashi, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 532 days.

(21) Appl. No.: 17/619,437

(22) PCT Filed: Jun. 15, 2020

(86) PCT No.: PCT/JP2020/023443
§ 371 (c)(1),
(2) Date: Dec. 15, 2021

(87) PCT Pub. No.: WO2020/262079
PCT Pub. Date: Dec. 30, 2020

(65) Prior Publication Data
US 2022/0384891 A1    Dec. 1, 2022

(30) Foreign Application Priority Data

Jun. 28, 2019 (JP) ................................ 2019-122219

(51) Int. Cl.
*H01M 50/242* (2021.01)
*H01M 10/625* (2014.01)
(Continued)

(52) U.S. Cl.
CPC ....... *H01M 50/242* (2021.01); *H01M 10/625* (2015.04); *H01M 10/658* (2015.04);
(Continued)

(58) Field of Classification Search
CPC ............ H01M 10/625; H01M 10/647; H01M 10/658; H01M 2220/20; H01M 50/209;
(Continued)

(56) References Cited

U.S. PATENT DOCUMENTS

2019/0178434 A1    6/2019  Sakatani et al.
2020/0411818 A1*  12/2020  Takeda ................ H01M 10/658
(Continued)

FOREIGN PATENT DOCUMENTS

CN    207993926 U    10/2018
CN    113614986 A    11/2021
(Continued)

OTHER PUBLICATIONS

Machine translation JP2014010983A (Year: 2014).*
(Continued)

*Primary Examiner* — Victoria H Lynch
(74) *Attorney, Agent, or Firm* — WHDA, LLP

(57) ABSTRACT

A power supply device includes a battery block in which a plurality of battery cells is stacked in a thickness with separator clamped therebetween, a pair of end plates disposed on opposing end faces of the battery block, and a binding bar coupled to the pair of end plates and fixing the battery block in a compressed state via the end plates, in order to absorb expansion of the battery cells with the separator and suppress degradation of the separator in a state of being heated by the battery cells. Separator has a three-layer structure including viscoelastic elastic sheet that absorbs expansion of battery cell and heat-insulating sheets laminated on opposing surfaces of elastic sheet, and heat-insulating sheet is hybrid material of an inorganic powder and a fibrous reinforcing material.

10 Claims, 8 Drawing Sheets

(51) Int. Cl.
  *H01M 10/658* (2014.01)
  *H01M 50/249* (2021.01)
  *H01M 50/264* (2021.01)
  *H01M 50/293* (2021.01)
  *H01M 50/489* (2021.01)
(52) U.S. Cl.
  CPC ....... *H01M 50/249* (2021.01); *H01M 50/264* (2021.01); *H01M 50/293* (2021.01); *H01M 50/489* (2021.01); *H01M 2220/20* (2013.01)
(58) Field of Classification Search
  CPC ............. H01M 50/242; H01M 50/249; H01M 50/264; H01M 50/293; H01M 50/489; Y02E 60/10
  See application file for complete search history.

(56) References Cited

U.S. PATENT DOCUMENTS

| | | |
|---|---|---|
| 2021/0143508 A1 | 5/2021 | Yoshida |
| 2022/0173454 A1 | 6/2022 | Kogami et al. |

FOREIGN PATENT DOCUMENTS

| | | | | |
|---|---|---|---|---|
| JP | 2011-023302 A | | 2/2011 | |
| JP | 2014010983 A | * | 1/2014 | ............ H01M 10/44 |
| JP | 2017-045508 A | | 3/2017 | |
| JP | 2018-204708 | | 12/2018 | |
| JP | 2018-206605 A | | 12/2018 | |
| WO | 2018/207607 A1 | | 11/2018 | |
| WO | 2018/211906 A1 | | 11/2018 | |
| WO | 2019/123903 A1 | | 6/2019 | |

OTHER PUBLICATIONS

International Search Report of PCT application No. PCT/JP2020/023443 dated Aug. 11, 2020.

Communication pursuant to Rule 114(2) EPC (Office Action) dated Sep. 5, 2022, for the related European Patent Application No. 20832268.5. (11 pages).

English Translation of Chinese Search Report dated Jan. 5, 2023, issued in counterpart CN application No. 202080033306.0. (3 pages).

* cited by examiner

POWER SUPPLY DEVICE, AND ELECTRIC VEHICLE AND POWER STORAGE DEVICE THAT COMPRISE SAID POWER SUPPLY DEVICE

CROSS-REFERENCE TO RELATED APPLICATIONS

This application is a U.S. national stage application of the PCT International Application No. PCT/JP2020/023443 filed on Jun. 15, 2020, which claims the benefit of foreign priority of Japanese patent application No. 2019-122219 filed on Jun. 28, 2019, the contents all of which are incorporated herein by reference.

TECHNICAL FIELD

The present invention relates to a power supply device in which a large number of battery cells are stacked, and an electric vehicle and a power storage device including the power supply device.

BACKGROUND ART

A power supply device in which a large number of battery cells are stacked is suitable as a power source that is mounted on an electric vehicle and supplies electric power to a motor that drives the vehicle, a power source that is charged with natural energy such as a solar cell or midnight power, and a backup power source for power failure. In the power supply device having this structure, the separator is clamped between the stacked battery cells. A power supply device in which a large number of battery cells are stacked with a separator clamped therebetween fixes the stacked battery cells in a compressed state in order to prevent positional misalignment due to expansion of the battery cells. In order to realize this, in the power supply device, a pair of end plates is disposed on both end faces of a battery block in which a large number of battery cells are stacked, and the pair of end plates is connected by a binding bar (see PTL 1).

CITATION LIST

Patent Literature

PTL 1: Unexamined Japanese Patent Publication No. 2018-204708

SUMMARY OF THE INVENTION

Technical Problem

In the power supply device, a plurality of battery cells is stacked to form a battery block, a pair of end plates is disposed on both end faces of the battery block, and the battery block is held in a compressed state by a considerably strong pressure from both end faces and connected by a binding bar. In the power supply device, the battery cells are fixed in a strongly compressed state to prevent malfunction due to relative movement or vibration of the battery cells. In this power supply device, for example, in a device using a battery cell having a stacked surface area of about 100 $cm^2$, the end plate is pressed with a strong force of several tons and fixed with a binding bar. In the power supply device having this structure, a hard plastic plate material is used as the separator in order to insulate the battery cells stacked adjacent to each other with the separator. The hard plastic separator cannot absorb the expansion of the battery cell in a state where the internal pressure of the battery cell increases and expands, and in this state, the surface pressure between the battery cell and the separator rapidly increases, and an extremely strong force acts on the end plate and the binding bar. For this reason, the end plate and the binding bar are required to have a very strong material and shape, and there is an adverse effect that the power supply device is heavy, large, and material cost increases.

In the power supply device, the elastic sheet crushed by the pressure of the battery cell is used as the separator, and the strong stress acting on the end plate and the binding bar can be reduced in a state where the battery cell expands due to an increase in internal pressure. Particularly, a rubber-like elastic sheet is used as the separator of the elastic sheet, and the separator is brought into close contact with the stacked surface of the battery cell in a surface contact state, so that expansion of the battery cell can be absorbed in a preferable state. However, the rubber-like elastic sheet deteriorates when heated to an abnormal high temperature in the battery cell, and has a disadvantage that viscoelasticity, which is an important physical property, decreases.

The present invention has been developed to solve the above disadvantages, and an object of the present invention is to provide a technique capable of absorbing expansion of a battery cell by a separator and suppressing degradation of the separator in a state of being heated by the battery cell.

Solution to Problem

A power supply device according to an aspect of the present invention includes battery block 10 including a plurality of battery cells 1 stacked in a thickness with separator 2 clamped therebetween, a pair of end plates 3 disposed on both end faces of battery block 10, and binding bar 4 coupled to the pair of end plates 3 and fixing battery block 10 in a compressed state via end plates 3. Separator 2 has a three-layer structure including viscoelastic elastic sheet 6 that absorbs expansion of battery cell 1 and heat-insulating sheets 5 laminated on opposing surfaces of the elastic sheet, and heat-insulating sheet 5 includes hybrid material 5A of an inorganic powder and a fibrous reinforcing material.

An electric vehicle according to an aspect of the present invention includes power supply device 100 described above, traction motor 93 that receives electric power from power supply device 100, vehicle body 91 that incorporates power supply device 100 and motor 93, and wheel 97 that is driven by motor 93 to let vehicle body 91 travel.

A power storage device according to an aspect of the present invention includes power supply device 100 described above and power supply controller 88 configured to control charging and discharging of power supply device 100. Power supply controller 88 enables charging of secondary battery cells 1 with electric power supplied from an outside and controls secondary battery cells 1 to charge.

Advantageous Effect of Invention

In the power supply device described above, expansion of the battery cell can be absorbed by the separator, and degradation of the separator in a state where the battery cell is heated can be suppressed.

DESCRIPTION OF EMBODIMENT

Figure 1:
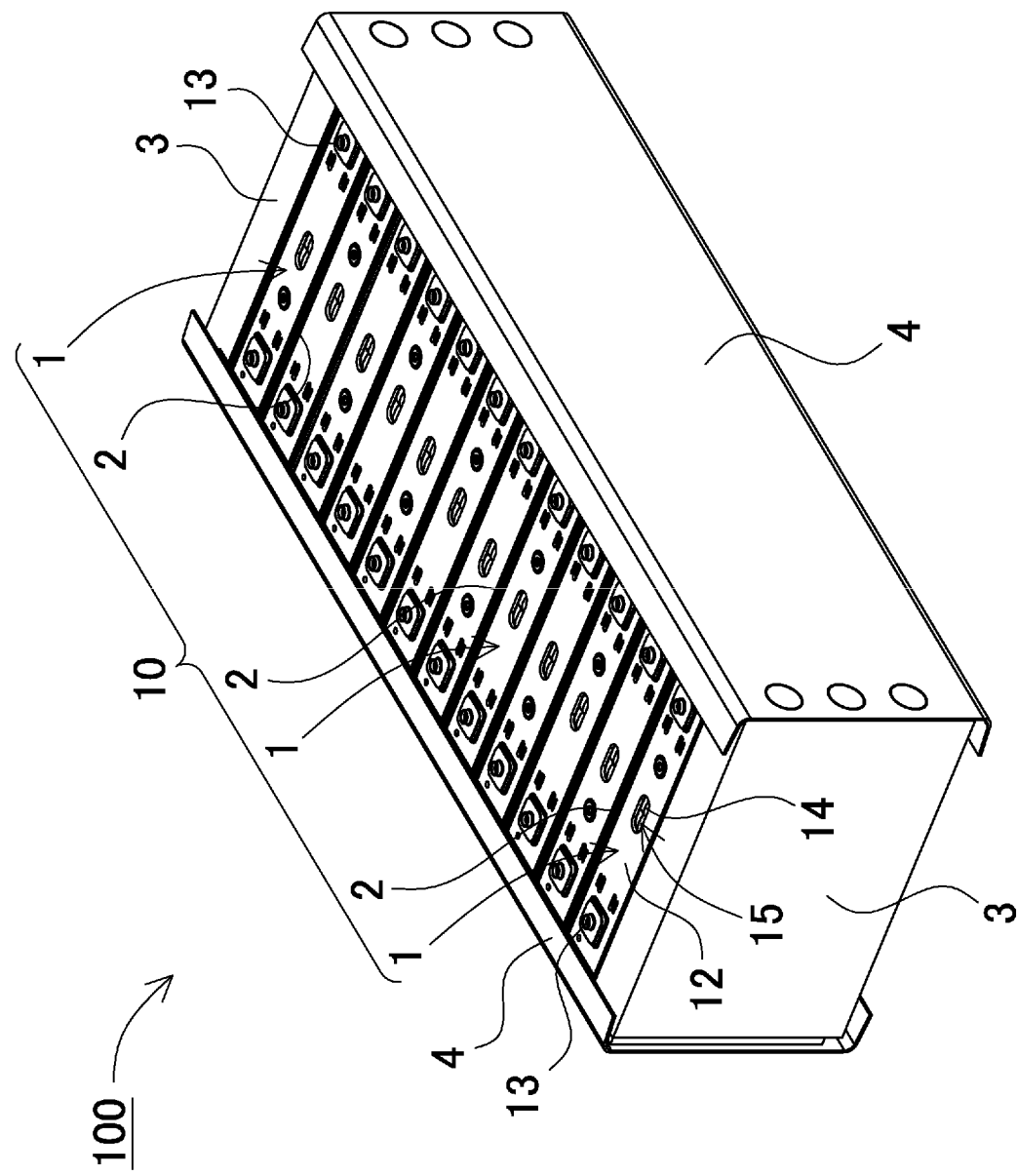
FIG. 1 is a perspective view of a power supply device according to an exemplary embodiment of the present invention.

Hereinafter, the present invention will be described in detail with reference to the drawings. In the following description, terms (for example, "top", "bottom", and other terms including those terms) indicating specific directions or positions are used as necessary. However, the use of those terms is for facilitating the understanding of the invention with reference to the drawings, and the technical scope of the present invention is not limited by the meanings of the terms. Portions denoted by the same reference numerals in a plurality of drawings indicate the identical or equivalent portions or members.

Further, the following exemplary embodiment illustrates specific examples of the technical concept of the present invention, and does not limit the present invention to the following exemplary embodiment. In addition, unless otherwise specified, dimensions, materials, shapes, relative arrangements, and the like of the components described below are not intended to limit the scope of the present invention, but are intended to be illustrative. The contents described in one exemplary embodiment and an example are also applicable to other exemplary embodiments and examples. In addition, sizes, positional relationships, and the like of members illustrated in the drawings may be exaggerated for clarity of description.

A power supply device according to a first exemplary embodiment of the present invention includes a battery block in which a plurality of battery cells is stacked in a thickness with a separator clamped between the plurality of battery cells, a pair of end plates disposed on opposing end faces of the battery block, and a binding bar coupled to the pair of end plates to fix the battery block in a compressed state via the end plates, in which the separator has a three-layer structure including a viscoelastic elastic sheet that absorbs expansion of each of the plurality of battery cells and a heat-insulating sheet laminated on opposing surfaces of the elastic sheet, and in which the heat-insulating sheet includes a hybrid material of an inorganic powder and a fibrous reinforcing material.

In the power supply device described above, since the heat-insulating sheet made of the hybrid material of the inorganic powder and the fibrous reinforcing material is laminated on the surface of the elastic sheet, the hybrid material prevents the damage due to the heat of the elastic sheet while the expansion of the battery cell is absorbed by the elastic sheet. Therefore, it is possible to suppress an increase in surface pressure between the battery cell and the separator in a state where the internal pressure of the battery cell increases and expands. Further, the elastic sheet is protected from heat generation of the battery cell in a state where the battery cell that expands due to an increase in internal pressure generates heat to a high temperature. Therefore, it is possible to prevent an adverse effect that the battery cell whose temperature has risen to a high temperature heats and deteriorates the elastic sheet. In a state where the internal pressure increases and the battery cell expands, the battery cell generates heat and has a high temperature. The hybrid material has a high heat resistant temperature because heat insulation characteristics are realized by the inorganic powder, and effectively blocks thermal energy of the battery cell to protect the elastic sheet in a state where the battery cell generates heat to a high temperature. Therefore, the separator stably absorbs expansion of the battery cell without losing elasticity in a state where the battery cell expands due to an increase in internal pressure.

Furthermore, in the power supply device described above, since the elastic sheet of the separator suppresses an increase in surface pressure due to expansion of the battery cell, it is possible to prevent the battery cell from expanding and an excessive stress from acting on the end plate and the binding bar. The end plate and the binding bar that can reduce the maximum stress can be made thin and lightweight. Further, in the power supply device in which the separator between the battery cells absorbs the expansion of the battery cells, it is possible to prevent the relative position from being shifted due to the expansion of the battery cells. This can also prevent adverse effects of the electrical connection part of the battery cell. This is because, although the stacked battery cells are electrically connected by fixing the bus bar of the metal sheet to the electrode terminal, when the battery cells are misaligned relatively to each other, an excessive stress acts on the bus bar and the electrode terminal, which causes a failure.

In the power supply device according to the second exemplary embodiment of the present invention, the heat-insulating sheet is made of a hybrid material of a silica aerogel and a fibrous reinforcing material.

In the power supply device described above, since the heat-insulating sheet laminated on the surface of the elastic sheet is made of a hybrid material of a silica aerogel and a fibrous reinforcing material, heat conduction between battery cells is effectively insulated by the heat-insulating sheet having excellent heat insulation characteristics, and induction of thermal runaway of the battery cells is suppressed. The thermal runaway of the battery cell occurs due to an internal short circuit caused by a short circuit between the positive electrode and the negative electrode inside, erroneous handling, or the like. Since a large amount of heat is generated when thermal runaway of the battery cell occurs, thermal runaway is induced in the adjacent battery cell when the heat insulation characteristics of the separator is not sufficient. When the thermal runaway of the battery cell is induced, the entire power supply device emits extremely large heat energy to impair safety as a device. A hybrid material of a silica aerogel and a fibrous reinforcing material is obtained by filling gaps of a fiber sheet with a silica aerogel, and has an extremely high porosity to realize excellent heat insulation characteristics such as a thermal conductivity of 0.02 W/m·K.

Furthermore, a hybrid material of a silica aerogel and a fibrous reinforcing material exhibits extremely excellent heat insulation characteristics, but has a disadvantage that the heat insulation characteristics are deteriorated when the silica aerogel is broken by strong compressive stress. However, since the hybrid material is laminated on an elastic sheet, expansion of the battery cell is absorbed by the elastic sheet, and deterioration of the heat insulation characteristics due to breakage of the silica aerogel can also be suppressed. A hybrid material that maintains excellent heat insulation characteristics protects the elastic sheet from heat generation of the battery cell, while also preventing induction of thermal runaway of the battery cell, and ensures safety of the power supply device for a long period of time.

In the power supply device according to the third exemplary embodiment of the present invention, the elastic sheet is at least one selected from a synthetic rubber sheet, a thermoplastic elastomer, and a foam material. In the power supply device according to the fourth exemplary embodiment of the present invention, the elastic sheet is made of synthetic rubber having a heat resistance limit temperature of 100° C. or higher.

In the power supply device according to the fifth exemplary embodiment of the present invention, the elastic sheet is any of fluororubber, isoprene rubber, styrene butadiene rubber, butadiene rubber, chloroprene rubber, nitrile rubber, hydrogenated nitrile rubber, polyisobutylene rubber, ethylene propylene rubber, ethylene vinyl acetate copolymer rubber, chlorosulfonated polyethylene rubber, acrylic rubber, epichlorohydrin rubber, urethane rubber, silicone rubber, thermoplastic olefin rubber, ethylene propylene diene rubber, butyl rubber, and polyether rubber.

In the power supply device according to the sixth exemplary embodiment of the present invention, the elastic sheet has a thickness between 0.2 mm and 2.0 mm, inclusive.

In the power supply device according to the seventh exemplary embodiment of the present invention, the heat-insulating sheet is made thicker than the elastic sheet.

In the power supply device according to the eighth exemplary embodiment of the present invention, the separator has a thickness between 1 mm and 3 mm, inclusive.

In a power supply device according to a ninth exemplary embodiment of the present invention, a battery cell includes a battery case whose upper end opening is closed with a sealing plate, and in which the separator includes the elastic sheet disposed in a body region, where the body region does not include a sealing part region clamped at an upper end of the battery case between the adjacent battery cells.

First Exemplary Embodiment

Hereinafter, more specific power supply devices and electric vehicles will be described in detail.

Figure 2:
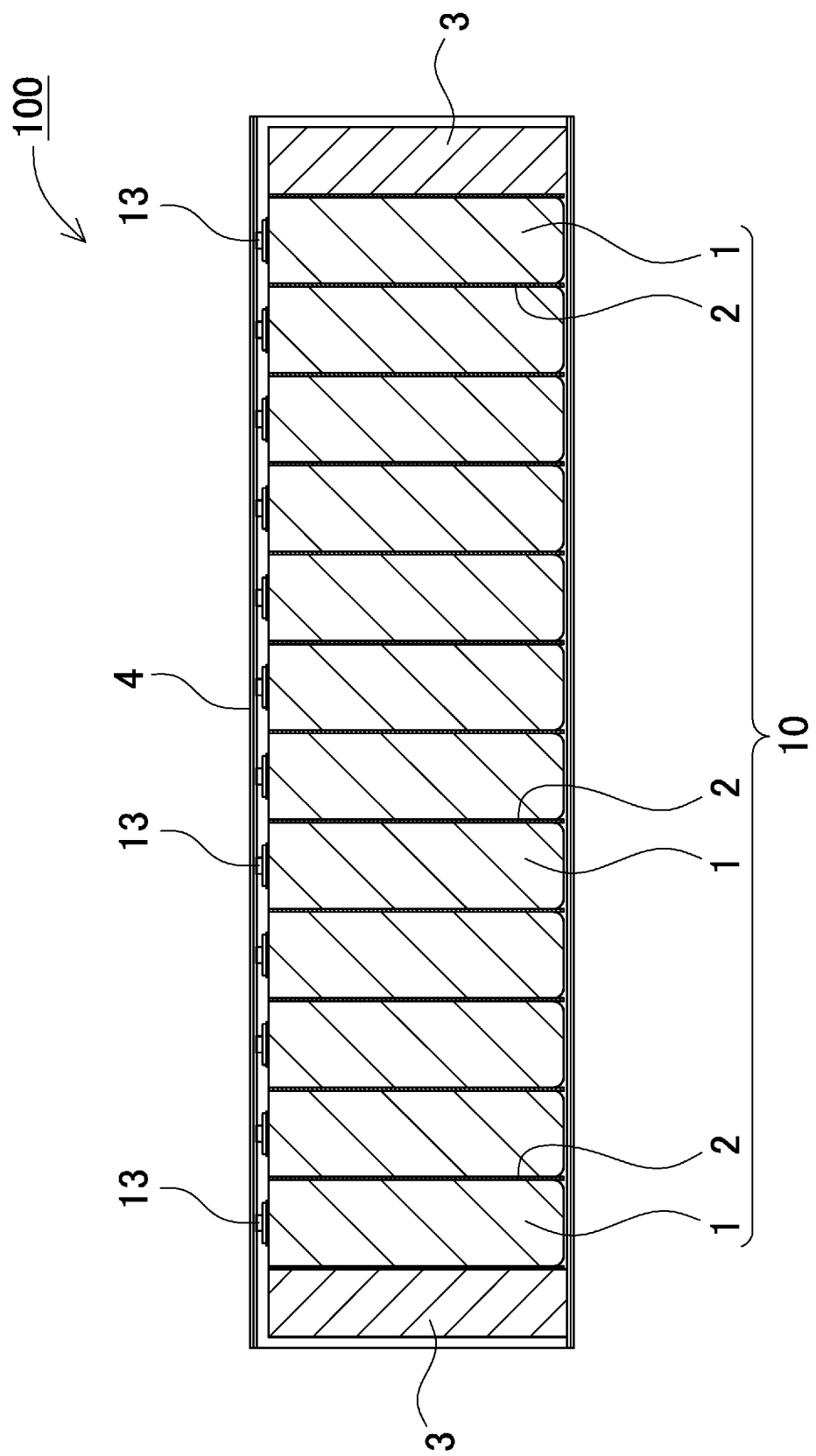
FIG. 2 is a vertical sectional view of the power supply device illustrated in FIG. 1.
Figure 3:
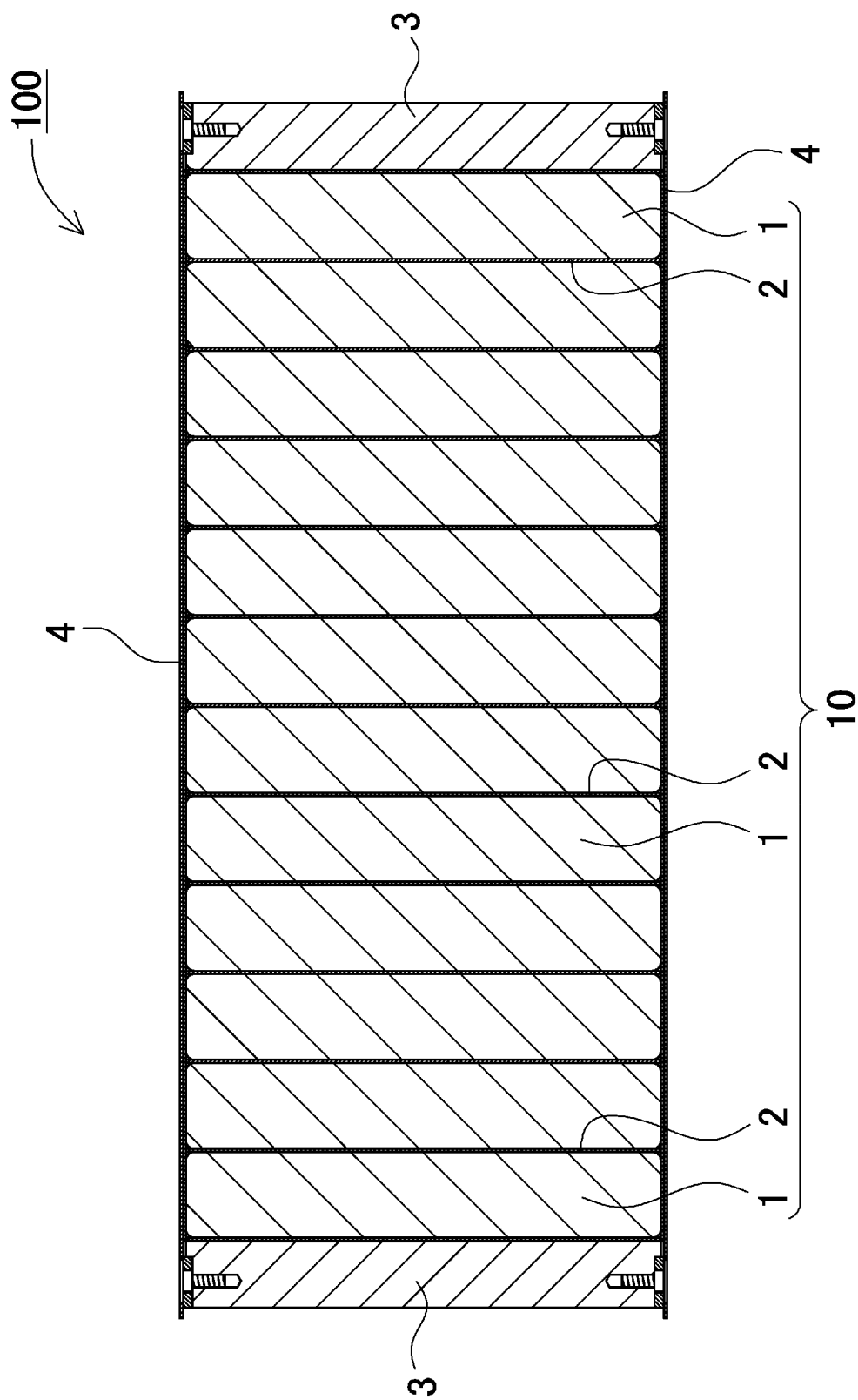
FIG. 3 is a horizontal sectional view of the power supply device illustrated in FIG. 1.

Power supply device 100 illustrated in a perspective view of FIG. 1, a vertical sectional view of FIG. 2, and a horizontal sectional view of FIG. 3 includes battery block 10 in which a plurality of battery cells 1 is stacked in a thickness with separator 2 clamped therebetween, a pair of end plates 3 disposed on opposing end faces of battery block 10, and binding bar 4 coupled to the pair of end plates 3 and fixing battery block 10 in a compressed state via end plates 3.

(Battery Block 10)

Figure 4:
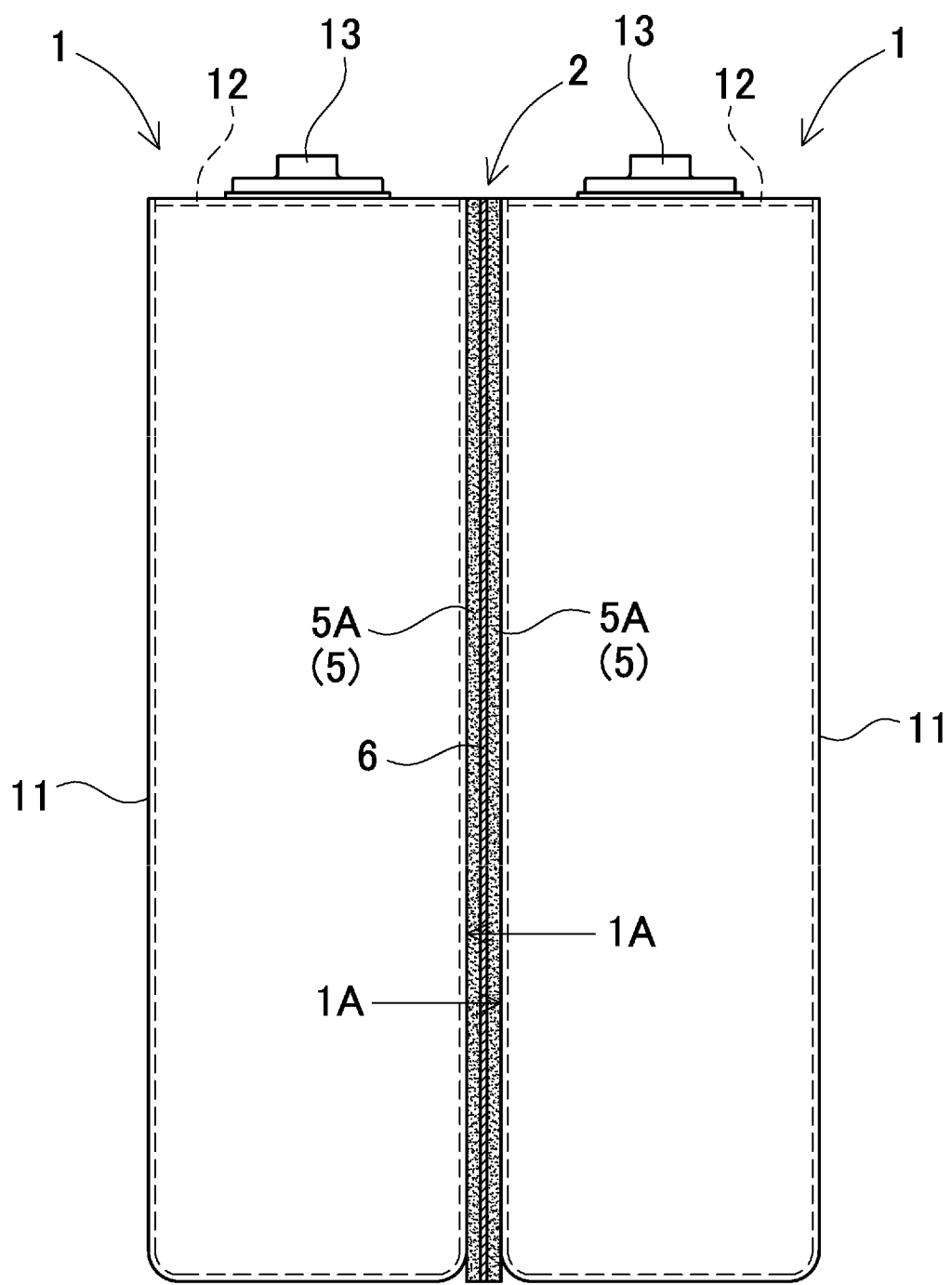
FIG. 4 is an enlarged sectional view illustrating a stacked state of a separator and a battery cell.

As shown in FIG. 4, battery cell 1 of battery block 10 is a prismatic battery cell having a quadrangular outer shape, and sealing plate 12 is laser-welded and airtightly fixed to the upper end opening of battery case 11 whose bottom is closed, so that the inside has a sealed structure. As shown in FIG. 1, sealing plate 12 is provided with a pair of positive and negative electrode terminals 13 protruding upward at both ends of the upper surface. Opening 15 of safety valve 14 is provided between electrode terminals 13. Safety valve 14 is opened to release internal gas when the internal pressure of battery cell 1 rises to a predetermined value or more. Safety valve 14 prevents an increase in internal pressure of battery cell 1.

(Battery Cell 1)

Battery cell 1 is a lithium ion secondary battery. Power supply device 100 in which battery cell 1 is a lithium ion secondary battery has an advantage that the charge capacity with respect to the capacity and weight can be increased. However, battery cell 1 may be any other chargeable battery such as a non-aqueous electrolyte secondary battery other than the lithium ion secondary battery.

(End Plate 3, Binding Bar 4)

End plate 3 is a metal sheet that has an outer shape substantially equal to the outer shape of battery cell 1, and that is not deformed by being pressed by battery block 10, and is coupled to binding bar 4 at both side edges. End plates 3 couples stacked battery cells 1 in a compressed state, and binding bar 4 fixes battery block 10 in the compressed state at a predetermined pressure.

(Separator 2)

Separator 2 is clamped between stacked battery cells 1, absorbs expansion of the battery cells due to an increase in internal pressure, further insulates adjacent battery cells 1, and further cuts off thermal conduction between battery cells 1. In battery block 10, a bus bar (not shown) of a metal sheet is fixed to electrode terminals 13 of adjacent battery cells 1, and battery cells 1 are connected in series or in parallel. In battery cells 1 connected in series, since a potential difference is generated in battery case 11, battery cells 1 are insulated and stacked by separator 2. Battery cells 1 connected in parallel are stacked while thermally insulated by separator 2 in order to prevent induction of thermal runaway although no potential difference is generated in battery case 11.

As shown in the enlarged sectional view of FIG. 4, separator 2 has a three-layer structure including elastic sheet 6 having elasticity that absorbs expansion of battery cell 1 due to an increase in internal pressure, and heat-insulating sheets 5 laminated on opposing surfaces of elastic sheet 6. Elastic sheet 6 is adjusted to have elasticity that absorbs expansion of battery cell 1 by being pressurized and deformed by battery cell 1 that expands due to an increase in internal pressure. The amount of deformation of elastic sheet 6 due to expansion of battery cell 1 is specified by the hardness of the material. Therefore, the hardness of elastic sheet 6 is set to an optimum value in consideration of the deformation amount of battery cell 1 that expands due to the increase in the internal pressure. The hardness of elastic sheet 6 is set to an optimum value in consideration of the pressure of battery cell 1, and is preferably between 30 degrees and 85 degrees, inclusive, and more preferably between 40 degrees and 85 degrees, inclusive, at normal temperature. When the hardness of elastic sheet 6 is too low, it is thinly crushed in a state in which battery cells 1 do not expand and in a state in which battery cells 1 are stacked and fixed in a compressed state by end plate 3, and conversely, when the hardness is too high, the deformation amount due to pressurization by battery cells 1 whose internal pressure rises is small, and the expansion of battery cells 1 cannot be absorbed. Therefore, the hardness of elastic sheet 6 is set to an optimum value capable of absorbing the expansion of battery cell 1 due to the increase in internal pressure in consideration of the pressure at which battery cell 1 pressurizes separator 2.

Elastic sheet 6 is a viscoelastic sheet having both viscosity and elasticity. The viscoelasticity is determined by the relaxation time of stress relaxation when a constant strain is applied to a substance, and when the relaxation time is sufficiently short with respect to the time scale of observation, it is regarded as viscosity, and when the relaxation time is long, it is regarded as an elastic body, and when the relaxation time is equal, it is regarded as viscoelasticity. However, in the present specification, "viscoelasticity" means a state having both properties of viscosity and elasticity, and is not specified to a state in which the relaxation time is equal. As viscoelastic elastic sheet 6, a synthetic rubber, a foam material, or a thermoplastic elastomer is suitable, and a synthetic rubber having a heat resistance limit temperature of 100° C. or higher is further suitable.

As elastic sheet 6, for example, silicone rubber, fluororubber, urethane rubber, isoprene rubber, styrene butadiene rubber, butadiene rubber, chloroprene rubber, nitrile rubber, hydrogenated nitrile rubber, polyisobutylene rubber, ethylene propylene rubber, ethylene vinyl acetate copolymer rubber, chlorosulfonated polyethylene rubber, acrylic rubber, epichlorohydrin rubber, thermoplastic olefin rubber, ethylene propylene diene rubber, butyl rubber, polyether rubber, and the like can be used.

Specifically, fluororubber and silicone rubber have a considerably high heat resistance limit temperature of 230° C., and are characterized by maintaining elasticity in a state of being heated to the battery cell at a high temperature, and being able to stably absorb expansion of a battery cell that generates heat at a high temperature. Furthermore, since the heat resistance limit temperature of the acrylic rubber is 160° C. and the heat resistance limit temperatures of the hydrogenated nitrile rubber, the ethylene propylene rubber, and the butyl rubber are 140° C., which are more than 100° C., expansion can be stably absorbed even in a state where the battery cell generates heat at a high temperature.

Heat-insulating sheet 5 is clamped between stacked surface 1A of battery cell 1 and elastic sheet 6 to insulate heat conduction from battery cell 1 that has generated heat to elastic sheet 6. Heat-insulating sheet 5 having a low thermal conductivity can lower the temperature of elastic sheet 6 in a state where heat-insulating sheet 5 is heated by high-temperature battery cell 1. Heat-insulating sheet 5 is hybrid material 5A of an inorganic powder having a low thermal conductivity and a fibrous reinforcing material. Optimum heat-insulating sheet 5 is hybrid material 5A of a silica aerogel and a fibrous reinforcing material in which an inorganic powder is a silica aerogel. In hybrid material 5A, silica aerogel is disposed in gaps between fiber sheets.

In hybrid material 5A of a silica aerogel and a fibrous reinforcing material, fiber gaps of fiber sheets are filled with a silica aerogel having a nano-sized porous structure. Hybrid material 5A is produced by impregnating fibers with a gel raw material of a silica aerogel. The fiber sheet is impregnated with a silica aerogel, then fibers are laminated, a gel raw material is reacted to form a wet gel, and the surface of the wet gel is hydrophobized and dried with hot air. The fiber of the fiber sheet is polyethylene terephthalate (PET). However, as the fiber of the fiber sheet, inorganic fibers such as flame-retardant oxidized acrylic fibers and glass wool can also be used.

In hybrid material 5A, the fiber diameter of the fiber sheet is preferably 0.1 μm to 30 μm. The fiber diameter of the fiber sheet is made smaller than 30 μm to reduce heat conduction by the fibers, so that heat insulation characteristics of heat-insulating sheet 5 can be improved. The silica aerogel has a cluster structure in which spherical bodies of 2 nm to 20 nm which are fine particles composed of a skeleton of silicon dioxide ($SiO_2$) and 90% to 98% of air are bonded, and has fine pores of less than or equal to 100 nm between the skeletons formed by clusters, and has a three-dimensional fine porous structure.

Hybrid material 5A, of a silica aerogel and a fibrous reinforcing material, which is heat-insulating sheet 5, has a characteristic that the heat insulation characteristics are deteriorated when the silica aerogel that is fragile is compressed and destroyed by the pressure of expanding battery cell 1. Laminated elastic sheet 6 suppresses the adverse effect of the silica aerogel being broken by pressurization by expanding battery cell 1. Elastic sheet 6 absorbs the expansion of the battery cell, and reduces the compressive stress of the silica aerogel at the time of expansion of battery cell 1 to prevent breakage. Therefore, in separator 2 having a laminated structure of elastic sheet 6 and hybrid material 5A, a synergistic effect in which the excellent heat insulation characteristics of hybrid material 5A prevent high-temperature failure of elastic sheet 6, and the viscoelasticity of elastic sheet 6 prevents breakage of a silica aerogel is exerted, so that expansion of battery cell 1 due to an increase in internal pressure can be absorbed over a long period of time.

Heat-insulating sheet 5 of hybrid material 5A of a silica aerogel and fibrous reinforcing material is thin and exhibits excellent heat insulation characteristics. Heat-insulating sheet 5 is set to have a thickness at which the temperature of elastic sheet 6 is lower than the heat resistance limit temperature in a state where battery cells 1 generate heat in consideration of preventing high-temperature failure of elastic sheet 6. Therefore, the thickness of heat-insulating sheet 5 is set to an optimum value in consideration of the maximum temperature of battery cell 1 that rises in temperature and the heat resistance limit temperature of elastic sheet 6, and ranges from, for example, 0.4 mm to 1.4 mm, preferably 0.5 mm to 1.2 mm. Further, heat-insulating sheets 5 of hybrid material 5A laminated at opposing surfaces of separator 2 can be thickened to suppress induction of thermal runaway of battery cell 1. Heat-insulating sheet 5 is set to a thickness capable of preventing induction of thermal runaway of battery cell 1 in consideration of energy generated by thermal runaway. The energy generated by the thermal runaway of battery cell 1 increases as the charge capacity of battery cell 1 increases. However, in the power supply device of the present exemplary embodiment, the thickness of heat-insulating sheet 5 is not specified in the above range, and the thickness of heat-insulating sheet 5 is set to an optimum value in consideration of the heat insulation characteristics of thermal runaway including the fiber sheet and the silica aerogel and the heat insulation characteristics required for preventing induction of thermal runaway of battery cell 1.

Since separator 2 is stacked between respective battery cells 1, thick separator 2 enlarges battery block 10. In order to miniaturize battery block 10, separator 2 is required to be as thin as possible. In the power supply device, the charge capacity with respect to the volume is an extremely important characteristic. In power supply device 100, in order to miniaturize battery block 10 and increase a charge capacity, separator 2 is required to have a characteristic of thinning elastic sheet 6 and heat-insulating sheet 5 and preventing induction of thermal runaway of battery cell 1. Elastic sheet 6 has, for example, a thickness between 0.2 mm and 1.0 mm, inclusive, and more preferably has a thickness between 0.3 mm and 0.8 mm, inclusive, to suppress an increase in compressive stress due to expansion of battery cell 1. Furthermore, elastic sheet 6 is preferably thinner than heat-insulating sheet 5 and reduces the compressive stress of the silica aerogel when battery cell 1 expands.

Figure 5:
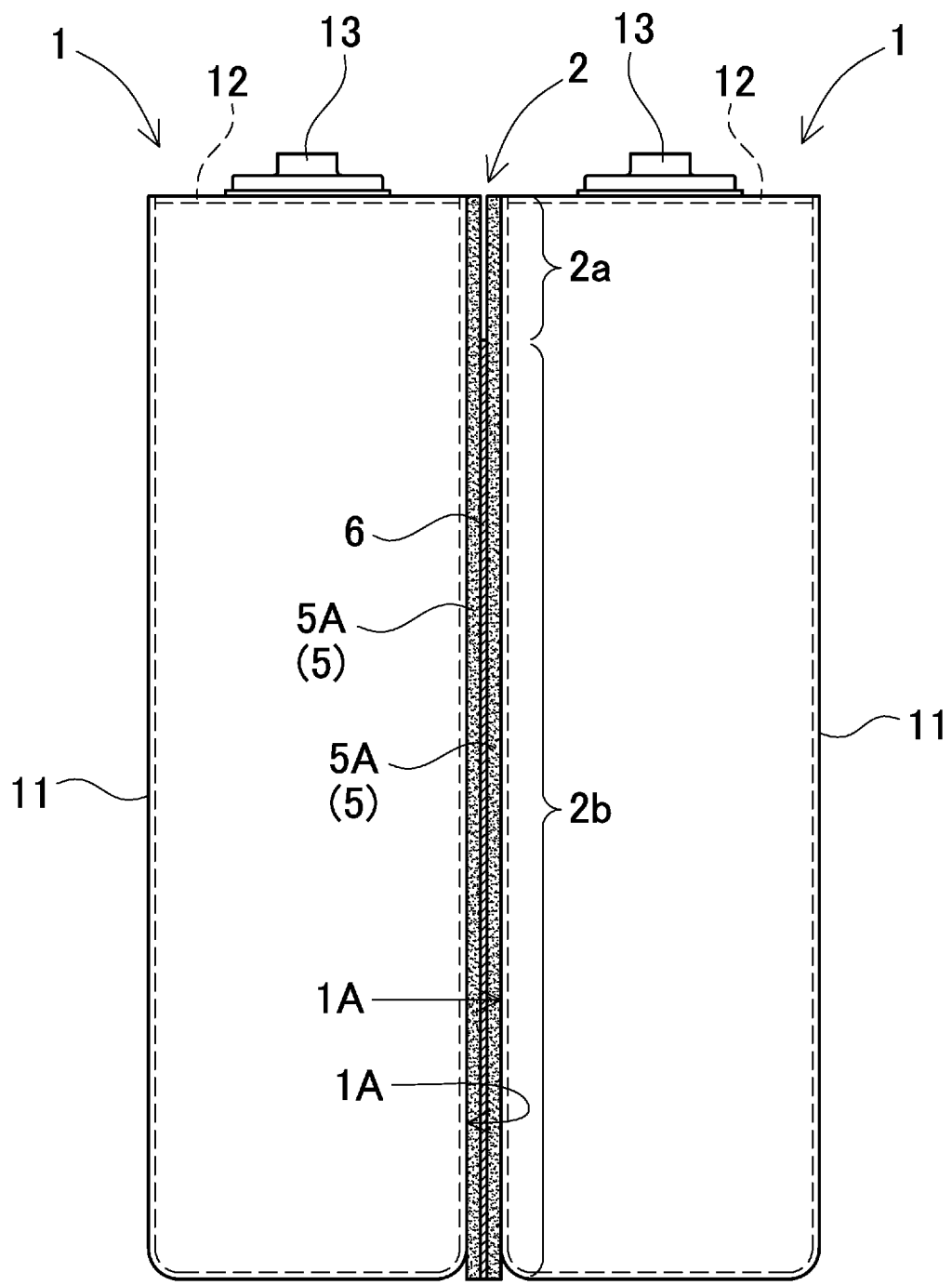
FIG. 5 is an enlarged sectional view illustrating another example of the separator.

Separator 2 in FIG. 4 has a quadrangular outer shape substantially equal to the outer shape of stacked surface 1A of battery cell 1. In separator 2, elastic sheet 6 and heat-insulating sheet 5 laminated in three layers have the same outer shape, and elastic sheet 6 is clamped so as to face the entire surface of heat-insulating sheet 5. However, separator 2 is not necessarily limited to a structure in which elastic sheet 6 is clamped so as to face the entire surface of heat-insulating sheet 5. As shown in FIG. 5, in separator 2, elastic sheet 6 can be disposed in body region 2b, where body region 2b does not include sealing part region 2a clamped at an upper end of battery case 11 between adjacent battery cells 1. In separator 2, elastic sheet 6 is not clamped in sealing part region 2a which is a region facing sealing plate 12 closing an upper end opening of battery case 11, and elastic sheet 6 is clamped in body region 2b excluding sealing part region 2a. In separator 2, elastic sheet 6 is disposed in a region that is subjected to a large compressive stress in a state where battery cell 1 is expanded, whereby expansion of battery cell 1 is absorbed by elastic sheet 6, and elastic sheet 6 is not disposed in a region along sealing plate 12 of battery cell 1, whereby deformation of the upper end of battery cell 1 can be suppressed to prevent damage to the upper end.

Preferably, in power supply device 100 described above, all separators 2 have a structure in which heat-insulating sheets 5 are laminated on opposing surfaces of elastic sheet 6, but all separators 2 do not necessarily have a structure in which heat-insulating sheets 5 are laminated on opposing surfaces of elastic sheet 6. In the power supply device, all the separators do not need to have a laminated structure of a heat-insulating sheet and an elastic sheet, and a separator having only a heat-insulating sheet and a separator having a laminated structure of a heat-insulating sheet and an elastic sheet can be provided in a mixed manner.

Elastic sheet 6 and heat-insulating sheet 5 are bonded to each other with an adhesive layer or a bonding layer clamped therebetween and laminated at a fixed position. Separator 2 and battery cell 1 are also joined to each other with an adhesive layer or a bonding layer clamped therebetween and disposed at a fixed position. Separator 2 can also be disposed at a fixed position of a battery holder (not shown) in which battery cells 1 are disposed at fixed positions in a fitting structure.

In power supply device 100 described above, battery cell 1 is a prismatic battery cell having a charge capacity of 6 Ah to 80 Ah, heat-insulating sheet 5 of separator 2 is "NASBIS (registered trademark) manufactured by Panasonic Corporation" made of a fiber sheet and a silica aerogel and having a thickness of 1 mm, and elastic sheet 6 laminated between two heat-insulating sheets 5 is a urethane rubber sheet having a thickness of 0.5 mm, so that specific battery cell 1 can be forcibly thermally runaway to prevent induction of thermal runaway to adjacent battery cell 1.

The power supply device described above can be used as an automotive power source that supplies electric power to a motor used to drive an electric vehicle. An electric vehicle incorporating the power supply device may be an electric vehicle such as a hybrid car or a plug-in hybrid car that is driven by an engine and a motor, or an electric car that is driven only by a motor. The power supply device can be used as a power source for any of these vehicles. Power supply device 100 having high capacity and high output to acquire electric power that drives the vehicle will be described below, for example. Power supply device 100 includes a large number of the above-described power supply devices connected in series or parallel, as well as a necessary controlling circuit added.

(Power Supply Device for Hybrid Vehicle)

Figure 6:
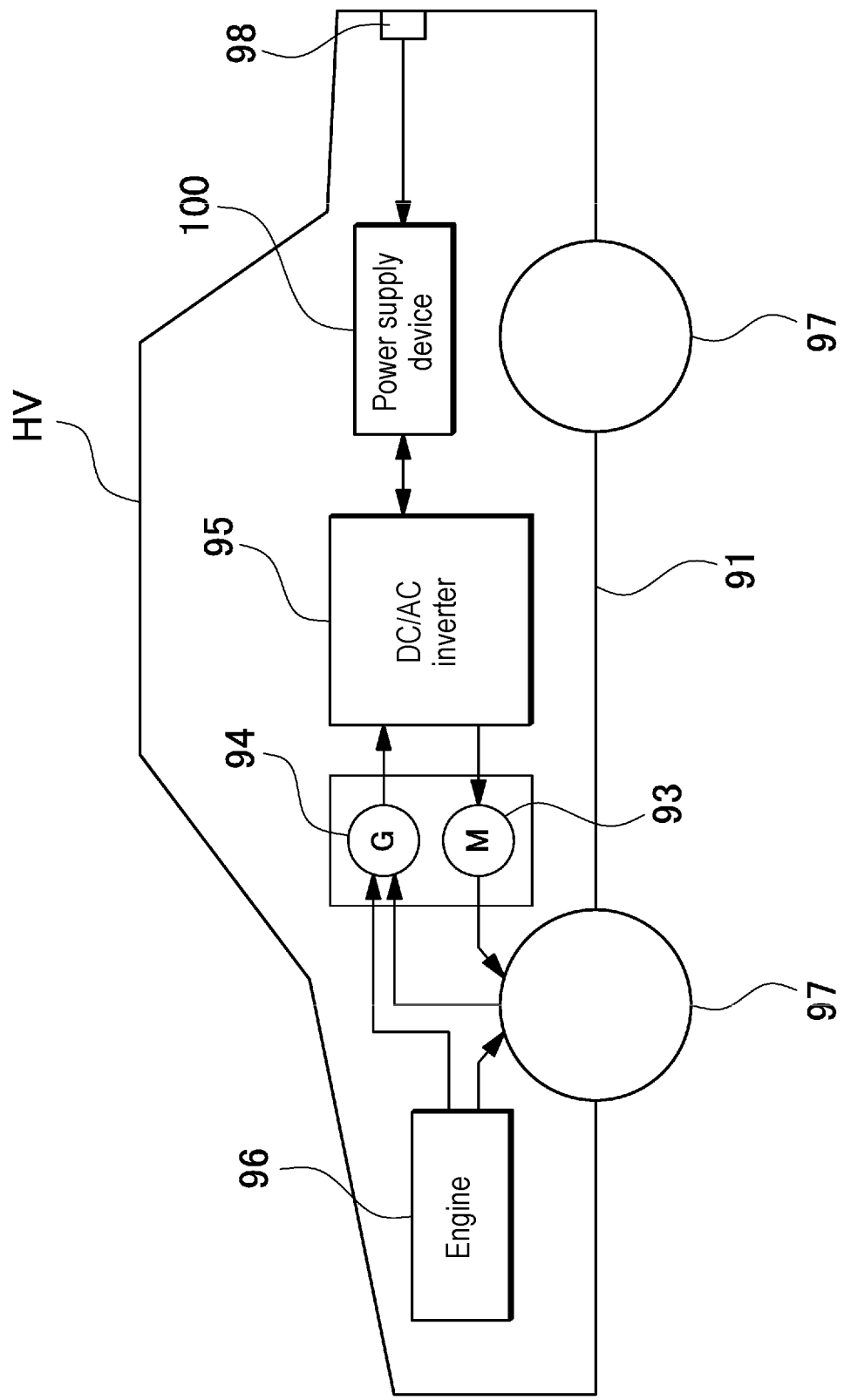
FIG. 6 is a block diagram illustrating an example of a power supply device mounted in a hybrid vehicle that is driven by an engine and a motor.

FIG. 6 illustrates an example of a power supply device incorporated in a hybrid car that is driven by both an engine and a motor. Vehicle HV incorporating the power supply device illustrated in this figure includes vehicle body 91, engine 96 and traction motor 93 to let vehicle body 91 travel, wheels 97 that are driven by engine 96 and traction motor 93, power supply device 100 to supply motor 93 with electric power, and power generator 94 to charge batteries included in power supply device 100. Power supply device 100 is connected to motor 93 and power generator 94 via DC/AC inverter 95. Vehicle HV travels by both motor 93 and engine 96 while charging and discharging the battery of power supply device 100. Motor 93 is driven when the engine efficiency is low, for example, during acceleration or low-speed travel, and makes the vehicle travel. Motor 93 runs on electric power supplied from power supply device 100. Power generator 94 is driven by engine 96 or driven through regenerative braking, a mechanism that slows the vehicle, to charge the batteries in power supply device 100. As illustrated in FIG. 6, vehicle HV may include charging plug 98 to charge power supply device 100. With charging plug 98 connected to an external power source, power supply device 100 can be charged.

(Power Supply Device for Electric Car)

Figure 7:
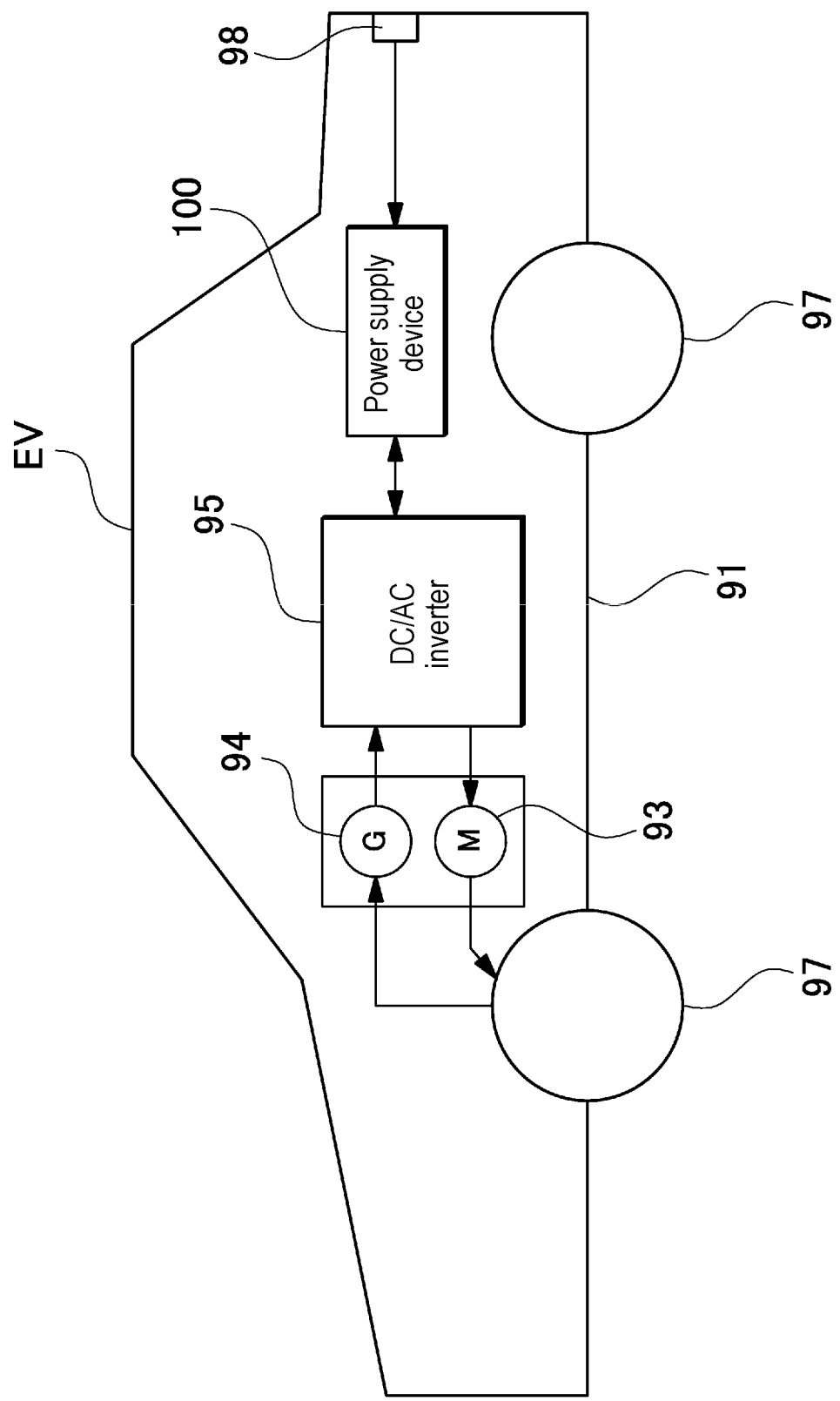
FIG. 7 is a block diagram illustrating an example of mounting the power supply device on an electric car that runs only with the motor.

FIG. 7 illustrates an example of a power supply device incorporated in an electric car that is driven only by a motor. Vehicle EV incorporating the power supply device illustrated in this figure includes vehicle body 91, traction motor 93 to let vehicle body 91 travel, wheels 97 that are driven by motor 93, power supply device 100 to supply motor 93 with electric power, and power generator 94 to charge batteries included in power supply device 100. Power supply device 100 is connected to motor 93 and power generator 94 via DC/AC inverter 95. Motor 93 runs on electric power supplied from power supply device 100. Power generator 94 is driven by energy that is produced from regenerative braking applied to vehicle EV and charges the batteries in power supply device 100. Vehicle EV includes charging plug 98. With charging plug 98 connected to an external power source, power supply device 100 can be charged.

(Power Supply Device for Power Storage Device)

Figure 8:
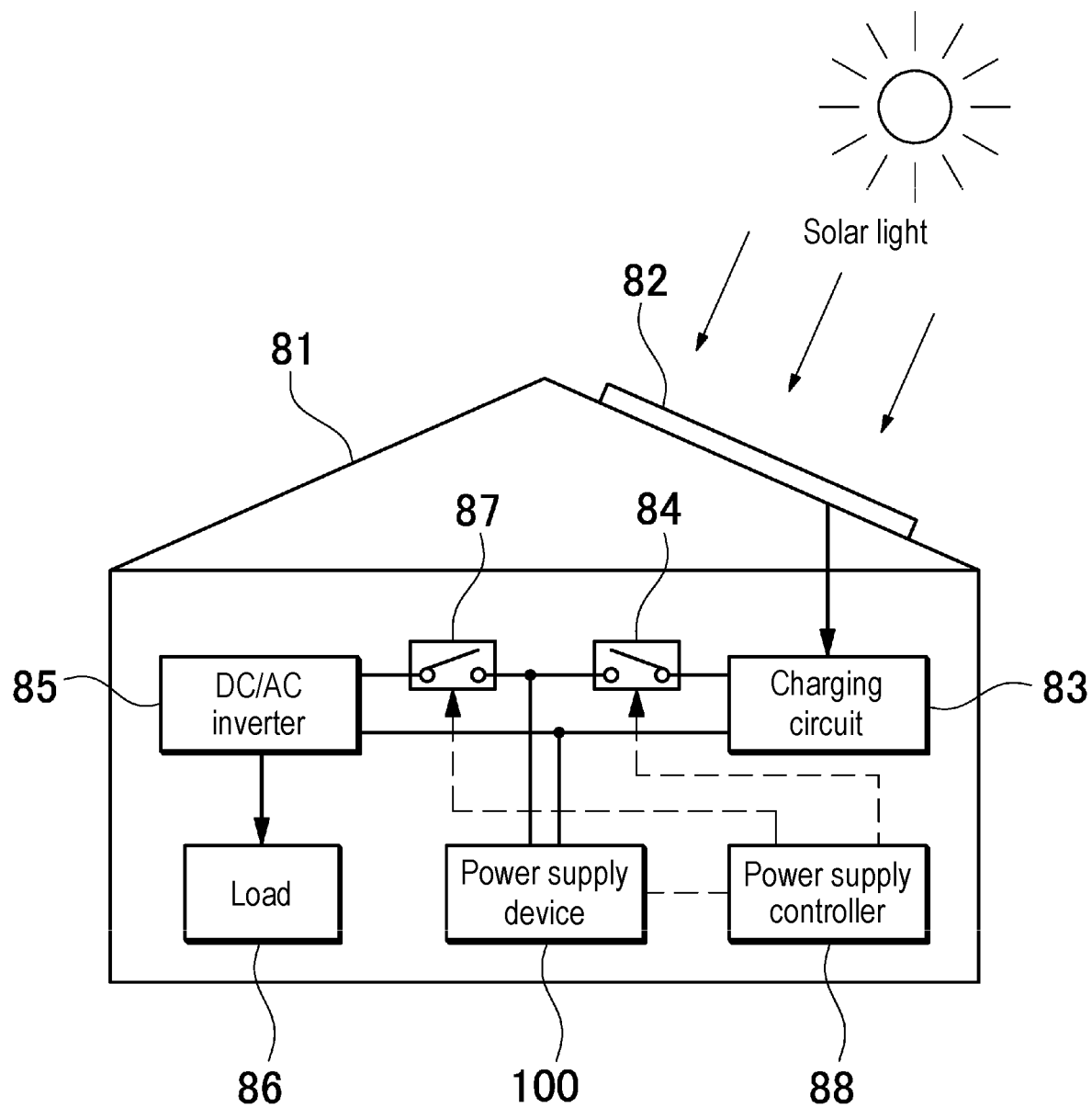
FIG. 8 is a block diagram illustrating an example of the technique applied to a power supply device for power storage.

In the present invention, the application of the power supply device is not limited to a power source to a motor that allows a vehicle to travel. The power supply device according to the exemplary embodiment can be used as a power source for a power storage device that stores electricity by charging a battery with electric power generated by photovoltaic power generation, wind power generation, or other methods. FIG. 8 illustrates a power storage device that stores electricity by charging batteries in power supply device 100 by solar cell 82.

The power storage device illustrated in FIG. 8 charges the batteries in power supply device 100 with electric power generated by solar cell 82 that is disposed, for example, on a roof or a rooftop of building 81 such as a house or a factory. In this power storage device, the battery of power supply device 100 is charged by charging circuit 83 using solar cell 82 as a charging power source, and then power is supplied to load 86 via DC/AC inverter 85. Therefore, the power storage device has a charge mode and a discharge mode. In the power storage device illustrated in the drawing, DC/AC inverter 85 and charging circuit 83 are connected to power supply device 100 via discharging switch 87 and charging switch 84, respectively. ON/OFF of discharging switch 87 and charging switch 84 is switched by power supply controller 88 of the power storage device. In a charge mode, power supply controller 88 switches charging switch 84 to ON and switches discharging switch 87 to OFF to allow charging from charging circuit 83 to power supply device 100. When charging is completed and the batteries are fully charged or when a capacity of the batteries is charged at a predetermined value or higher, power supply controller 88 turns off charging switch 84 and turns on discharging switch 87 to switch to the discharge mode and permits power supply device 100 to discharge electricity into load 86. When needed, the power supply controller is allowed to turn on charging switch 84 and turn on discharging switch 87 to supply electricity to load 86 and charge power supply device 100 simultaneously.

Further, although no illustration is given, the power supply device can be used as a power source for a power storage device that stores electricity by charging a battery using midnight power at nighttime. The power supply device charged by midnight power can be charged with midnight power, which is surplus power at power plants, to output electric power during the daytime when the electric power load is high, and to restrict peak power consumption at a low level in the daytime. The power supply device can also be used as a power source that is charged with both output power of a solar cell and midnight power. By effectively using both electric power generated by the solar cell and midnight power, this power supply device can efficiently store electricity in consideration of the weather and power consumption.

The power storage device described above can be suitably used for the following applications: a backup power supply device mountable in a rack of a computer server; a backup power supply device used for radio base stations of cellular phones; a power source for storage used at home or in a factory; a power storage device combined with a solar cell, such as a power source for street lights; and a backup power source for traffic lights or traffic displays for roads.

INDUSTRIAL APPLICABILITY

The power supply device according to the present invention is suitably used as a large current power source used for a power source of a motor that drives an electric vehicle such as a hybrid car, a fuel cell car, an electric car, or an electric motorcycle. Examples of such a power supply device include power supply devices for a plug-in hybrid electric car that can switch between the EV drive mode and the HEV drive mode, a hybrid electric car, an electric car, and the like. The power supply device can also be appropriately used for the following applications: a backup power supply device mountable in a rack of a computer server; a backup power supply device used for radio base stations of cellular phones; a power source for storage used at home or in a factory; a power storage device combined with a solar cell, such as a power source for street lights; and a backup power source for traffic lights.

REFERENCE MARKS IN THE DRAWINGS

100 power supply device
1 battery cell
1A stacked surface
2 separator
2a sealing part region
2b body region
3 end plate
4 binding bar
5 heat-insulating sheet
5A hybrid material
6 elastic sheet
10 battery block
11 battery case
12 sealing plate
13 electrode terminal
14 safety valve
15 opening
81 building
82 solar cell
83 charging circuit
84 charging switch
85 DC/AC inverter
86 load
87 discharging switch
88 power supply controller
91 vehicle body
93 motor
94 power generator
95 DC/AC inverter
96 engine
97 wheel
98 charging plug HV
EV vehicle

The invention claimed is:

1. A power supply device comprising:
a battery block including a plurality of battery cells stacked in a thickness with a separator clamped between each adjacent pair of the plurality of battery cells;
a pair of end plates disposed on opposing end faces of the battery block; and
a binding bar coupled to the pair of end plates to fix the battery block in a compressed state via the end plates,
wherein the separator includes a three-layer structure including (i) an elastic sheet that is viscoelastic and absorbs expansion of the adjacent pair of the plurality of battery cells, and (ii) (iii) heat-insulating sheets laminated on opposing surfaces of the elastic sheet,
each of the heat-insulating sheets includes a hybrid material of an inorganic powder and a fibrous reinforcing material, and
wherein each of the plurality of battery cells includes a battery case whose upper end opening is closed with a sealing plate, and
the separator includes the elastic sheet disposed in a body region, the body region not including a sealing part region clamped at an upper end of the battery case between the adjacent pair of the plurality of battery cells.

2. The power supply device according to claim 1, wherein the heat-insulating sheet includes a hybrid material of a silica aerogel and a fibrous reinforcing material.

3. The power supply device according to claim 1, wherein the elastic sheet is at least one selected from a synthetic rubber sheet, a thermoplastic elastomer, or a foam material.

4. The power supply device according to claim 3, wherein the elastic sheet includes synthetic rubber including a heat resistance limit temperature of 100° C. or higher.

5. The power supply device according to claim 3, wherein the elastic sheet includes any of fluororubber, isoprene rubber, styrene butadiene rubber, butadiene rubber, a chloroprene rubber, a nitrile rubber, a hydrogenated nitrile rubber, polyisobutylene rubber, ethylene propylene rubber, ethylene vinyl acetate copolymer rubber, chlorosulfonated polyethylene rubber, acrylic rubber, epichlorohydrin rubber, urethane rubber, silicone rubber, thermoplastic olefin rubber, ethylene propylene diene rubber, butyl rubber, or polyether rubber.

6. The power supply device according to claim 1, wherein the elastic sheet has a thickness between 0.2 mm and 2.0, inclusive.

7. The power supply device according to claim 1, wherein the heat-insulating sheet is thicker than the elastic sheet.

8. The power supply device according to claim 1, wherein the separator has a thickness between 1 mm and 3 mm, inclusive.

9. An electric vehicle including the power supply device according to claim 1, the electric vehicle comprising:
   the power supply device;
   a motor for travelling that receives electric power from the power supply device;
   a vehicle body that incorporates the power supply device and the motor; and
   a wheel that is driven by the motor to cause the vehicle body travel.

10. A power storage device including the power supply device according to claim 1, the power storage device comprising:
   the power supply device; and
   a power supply controller configured to control charging and discharging of the power supply device,
   wherein the power supply controller enables charging of the plurality of battery cells with electric power supplied from an outside and causes the plurality of battery cells to charge.

* * * * *